(12) United States Patent
Cooper et al.

(10) Patent No.: US 12,015,218 B2
(45) Date of Patent: Jun. 18, 2024

(54) CABLE LOCKING DEVICE

(71) Applicant: Elco Enterprises, Inc., Jackson, MI (US)

(72) Inventors: Edward L Cooper, Clarklake, MI (US); Steven J. Hayes, Addison, MI (US)

(73) Assignee: ELCo Enterprises, Inc., Jackson, MI (US)

( * ) Notice: Subject to any disclaimer, the term of this patent is extended or adjusted under 35 U.S.C. 154(b) by 0 days.

(21) Appl. No.: 17/625,491

(22) PCT Filed: Jul. 9, 2020

(86) PCT No.: PCT/US2020/041370
§ 371 (c)(1),
(2) Date: Jan. 7, 2022

(87) PCT Pub. No.: WO2021/007413
PCT Pub. Date: Jan. 14, 2021

(65) Prior Publication Data
US 2022/0271463 A1    Aug. 25, 2022

Related U.S. Application Data

(60) Provisional application No. 62/871,817, filed on Jul. 9, 2019.

(51) Int. Cl.
*H01R 13/213* (2006.01)
*H01R 13/193* (2006.01)
(Continued)

(52) U.S. Cl.
CPC ......... *H01R 13/213* (2013.01); *H01R 13/193* (2013.01); *H01R 13/5219* (2013.01); *H01R 13/625* (2013.01)

(58) Field of Classification Search
None
See application file for complete search history.

(56) References Cited

U.S. PATENT DOCUMENTS 3,321,733 A * 5/1967 Thomas ................. H01R 13/53
                                                                    439/271
4,960,395 A    10/1990 Ushler
(Continued)

FOREIGN PATENT DOCUMENTS

CN         109742577 A    5/2019
WO      2015116967 A1    8/2015

*Primary Examiner* — Ross N Gushi
(74) *Attorney, Agent, or Firm* — Dickinson Wright PLLC

(57) ABSTRACT

A cable locking device includes a first part and a second part. The first part includes a first cavity for receiving a first electrical wire and a second cavity. The second part includes a first cavity for receiving a second electrical wire and a projection. The projection is configured to be inserted into the second cavity of the first part. A first channel is formed within the second cavity of the first part and extends from an opening of the second cavity. A second channel is formed within the second cavity of the first part and is connected to the first channel and extends in a transverse direction of the first channel. A pin is formed on the projection of the second part and is configured to fit within the first channel and the second channel of the first part. The pin is configured to engage sidewalls of the second channel so as to frictionally hold into place the pin with respect to the second channel to connect the first part to the second part.

13 Claims, 3 Drawing Sheets

(51) Int. Cl.
*H01R 13/52* (2006.01)
*H01R 13/625* (2006.01)

(56) References Cited

U.S. PATENT DOCUMENTS

| | | | | |
|---|---|---|---|---|
| 5,317,109 | A * | 5/1994 | Aldissi | H01R 4/187 |
| | | | | 439/879 |
| 6,003,724 | A * | 12/1999 | Collins | A47F 1/065 |
| | | | | 221/221 |
| 7,077,681 | B2 * | 7/2006 | Behoo | H01R 4/54 |
| | | | | 439/889 |
| 7,195,505 | B1 | 3/2007 | Becker | |
| 8,657,624 | B2 * | 2/2014 | Yoshida | H01R 13/5219 |
| | | | | 439/578 |
| 9,325,124 | B2 * | 4/2016 | Zhao | H01R 13/59 |
| 2003/0226823 | A1 | 12/2003 | Rujimoto et al. | |
| 2008/0146064 | A1 | 6/2008 | Bankstahl | |
| 2009/0208281 | A1 | 8/2009 | Noh | |
| 2010/0003867 | A1 | 1/2010 | Lehmann et al. | |
| 2010/0136808 | A1 * | 6/2010 | Vanzo | H01R 13/625 |
| | | | | 29/874 |
| 2013/0047429 | A1 | 2/2013 | Tilley | |
| 2014/0368069 | A1 | 12/2014 | Ren | |
| 2018/0026386 | A1 | 1/2018 | Binzel | |

* cited by examiner

CABLE LOCKING DEVICE

CROSS-REFERENCE TO RELATED APPLICATIONS

This PCT application claims the benefit of priority under 35 U.S.C. § 119 to U.S. Provisional Application No. 62/871,817, filed Jul. 9, 2019, the contents of which are incorporated herein by reference in their entirety.

BACKGROUND

1. Field of the Invention

The present invention generally relates to systems and methods for selectively connecting electrical cables to each other.

2. Description of Related Art

An electrical cable is an assembly of one or more electrical conductor wires running side by side or bundled, which is used to carry electric current. Depending on the application, the requirement of current capacity to be provided by the electrical cable can vary. However, in high-power applications, such as gas metal arc welding, power delivery, electric vehicle charging, and the like, electrical cables not only need the appropriate gaging to provide the required current carrying capacity, but also must have the ability to connect and disconnect from one or more electrical devices. As such, somewhere along the length of the electrical cable, there is generally an electrical connector so as to allow the connection or disconnection of the device from electrical cable or the possibility of adding additional electrical cabling so as to extend the overall length of the electrical cable.

SUMMARY

A cable locking device in accordance with an embodiment of the present invention includes a first part and a second part. The first part includes a first cavity for receiving a first electrical wire and a second cavity. The second part includes a first cavity for receiving a second electrical wire and a projection. The projection is configured to be inserted into the second cavity of the first part. A first channel is formed within the second cavity of the first part and extends from an opening of the second cavity. A second channel is formed within the second cavity of the first part and is connected to the first channel and extends in a transverse direction of the first channel. A pin is formed on the projection of the second part and is configured to fit within the first channel and the second channel of the first part. The pin is configured to engage sidewalls of the second channel so as to hold into place the pin with respect to the second channel to connect the first part to the second part.

Further objects, features, and advantages of this invention will become readily apparent to persons skilled in the art after a review of the following description, with reference to the drawings and claims that are appended to and form a part of this specification.

BRIEF DESCRIPTION OF THE DRAWINGS

FIGS. 1A and 1B illustrate a cross-sectional view of the cable locking device, wherein FIG. 1A illustrates the cable locking device in a disconnected state, while FIG. 1B illustrates the cable locking device in a connected state;

DETAILED DESCRIPTION

Figure 1A:
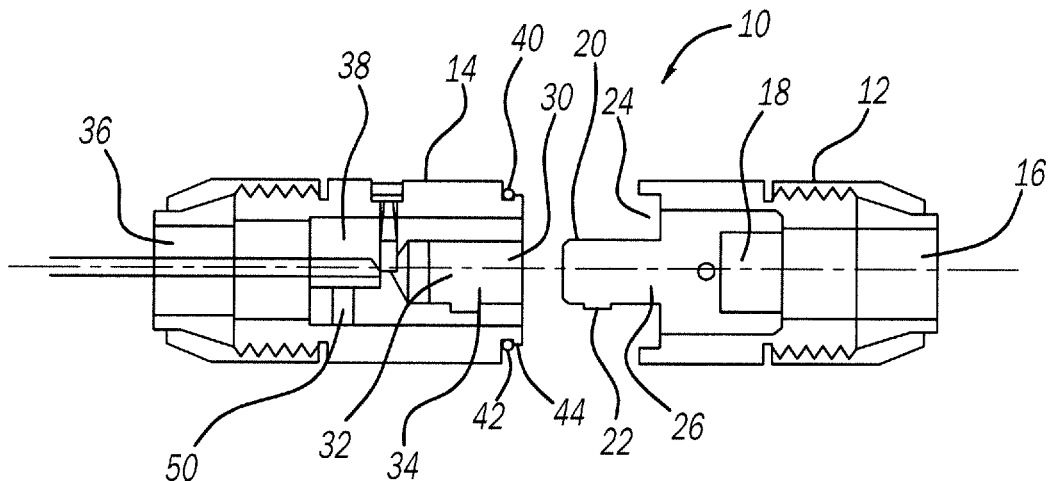
Figure 1B:
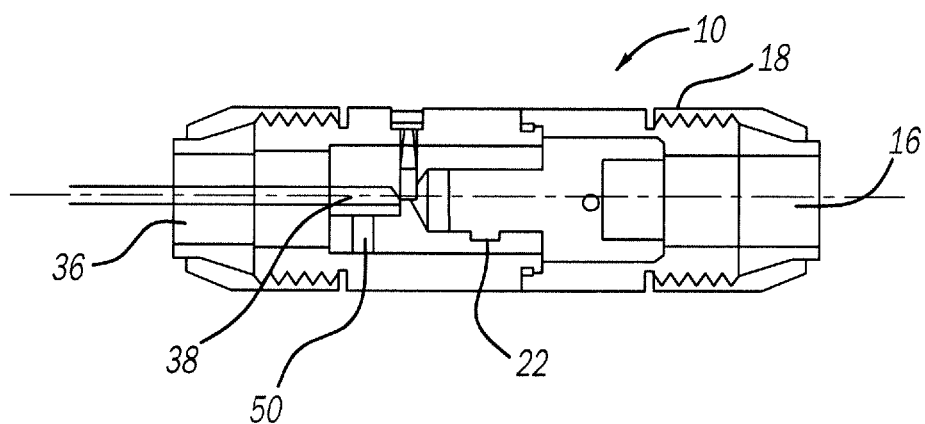
Figure 2A:
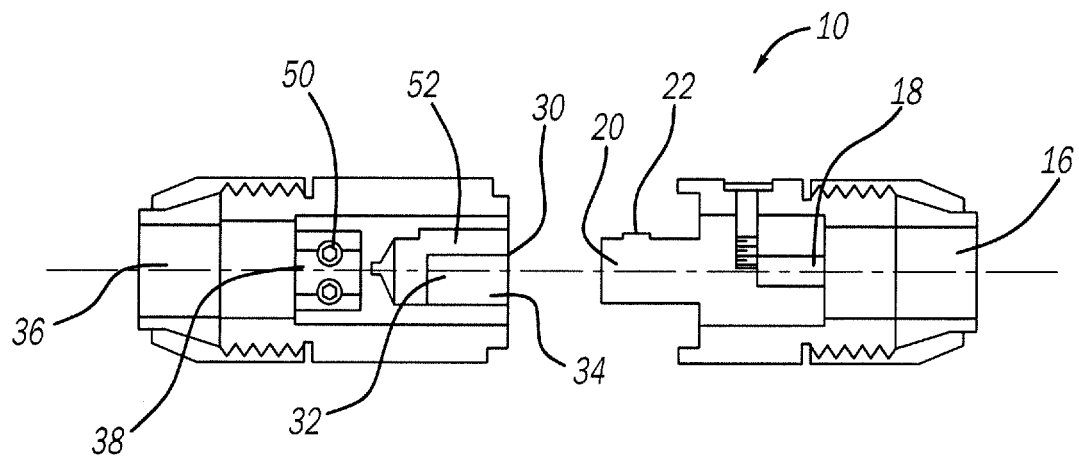
FIGS. 2A and 2B illustrate a cross-sectional view of the cable locking device of FIGS. 1A and 1B, but rotated 90 degrees.
Figure 2B:
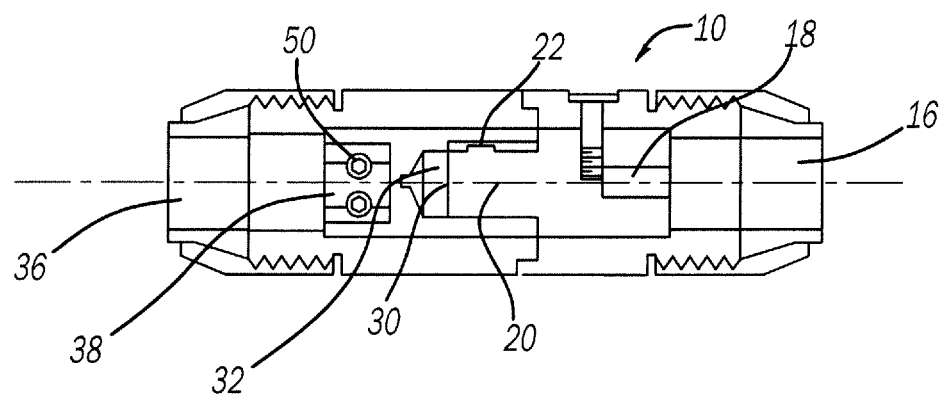

Referring to FIGS. 1A, 1B, 2A, and 2B a cross-sectional view of a cable locking device 10 is shown. FIG. 1A illustrates the cable locking device 10 in a disconnected state, while FIG. 1B illustrates the cable locking device 10 in a connected state. FIGS. 2A and 2B illustrate cross-sectional views of the cable locking device 10 of FIGS. 1A and 1B, but rotated 90 degrees.

As its primary components, the cable locking device 10 has a first part 12 and a second part 14 that are configured to connect to each other to create an electrical connection to a first electrical cable connected to the first part 12 and a second electrical cable connected to the second part 14. The first part 12 and/or the second part 14 may be made of an electrically conductive material, such as copper The first part 12 generally has a cavity 18 defining an opening 16. An electrical wire may be inserted within the cavity 18 via the opening 16. The electrical wire inserted within the cavity 18 may be a multistranded wire having a consolidated end. This consolidated end may be achieved by ultrasonically melting (or softening) and fusing the wires together located on the end of the wire that is inserted into the cavity 18.

On the opposing side of the opening 16, is a projection 20. The projection 20 has a pin 22 that extends perpendicular to the length of the projection 20. The first part 12 his a circular channel 24 that generally surrounds a base 26 of the projection 20.

The second part 14 also has a cavity 38 that defines an opening 36 for receiving an electrical wire. Like before, the electrical wire may be a multistranded electrical wire having a consolidated end that is inserted to the cavity 38 via the opening 36. The consolidated end may be formed by ultrasonically melting (or softening) the wires located at the end of the wire.

The second part 14 also includes a cavity 32 that defines an opening 30. Within this cavity 32 is a first channel 52 and a second channel 34. The first channel 52 generally extends longitudinally along the length of the cavity 32. The second channel 34 is connected to the first channel 52 at a location that is spaced from the opening 30. The second channel 34 generally extends in a perpendicular or transverse direction in relation to the direction of the first channel.

The second part 14 may have a reduced diameter rim 40. This reduced diameter rim 40 may also have a groove 42 for receiving a gasket 44, such as an O ring, which can create a water tight seal. The reduced diameter rim 40 of the second part 14 is sized and shaped so as to fit into the circular channel 24 of the first part 12.

When one wishes to connect the first part 12, to the second part 14, one inserts the projection 20 of the first part 12 into the opening 30 of the second part 14. In order to insert the projection 20 into the opening 30, the pin 22 of the projection 20 must be aligned with the channel 52 so as to allow the projection 20 to travel into the cavity 32. When the reduced diameter channel 40 comes into contact with the circular channel 24, one must then twist the first part 12 and/or the second part 14 so as to guide the pin 22 of the projection into the second channel 34 of the second part 14. The sidewalls of the second channel 34 may be such that as the pin 22 travels down the second channel 34, the sidewalls of the second channel 34 engage the pin 22. This interlocking engagement of the pin 22 prevents the inadvertent disconnecting of the first part 12 to the second part 14. The engagement of the pin 22 to the sidewalls of the second channel 34 must be overcome by a greater force, which prevents the accident so disconnection of the first part 12 to the second part 14.

One or more setscrews 50 may be utilized with in the first part 12 and/or the second part 14. In this example, the setscrews 50 essentially engage and prevent the accidental removal of any electrical wire inserted into the opening 36 and resting within the cavity 38. A similar arrangement may be utilized so as to prevent the accidental removal of an electrical wire inserted into the opening 16 of the first part 12.

Additionally, a set screw could also be utilized so as physically lock the first part 12 to the second part 14 together. As such, in addition to overcoming the frictional engagement of the pin 22 to the side wall of the second channel 34, one would also need to remove this set screw so as to allow the first part 12 to be separated from the second part 14. This may be advantageous in certain situations where one wishes to make sure that even under the influence of outside forces the first part 12 is not accidentally separated from the second part 14.

Figure 3:
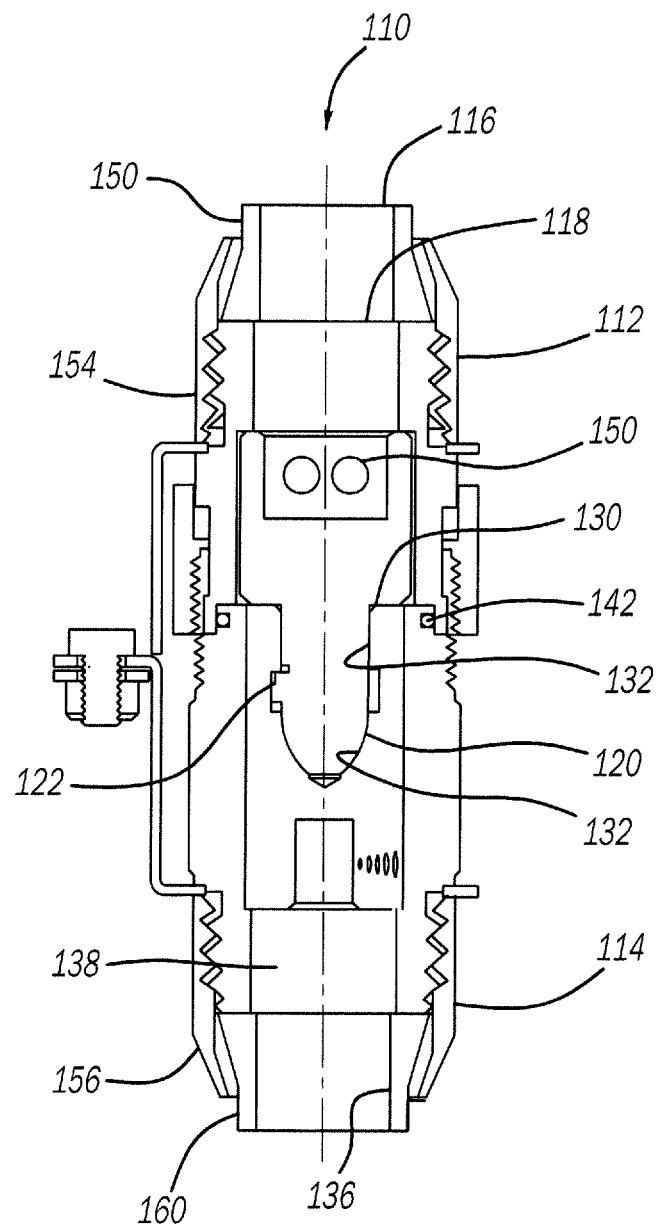
FIG. 3 is a cross-sectional view of a cable locking device in accordance with a second embodiment of the present invention.

FIG. 3 illustrates a second embodiment of a cable locking device 110 in accordance with the present invention. Components identical or similar to those of the first embodiment are identified by like reference numbers with 100 added. As in the first embodiment, first part 112 is connected with second part 114, and cavity 118 is formed in opening 116. First part 112 is substantially identical to first part 12 as described previously with the exception that projection 120 has a different shaped configuration. In this case, the terminal end of projection 120 tapers forming a convex outer surface which may be formed as a partially circular, elliptical, or formed otherwise as a curved shape. The outer shape of projection 120 can be described as a curved line rotated about the longitudinal axis of symmetry of projection 120. The shape can also be described as symmetrical about the longitudinal axis of first part 112. Pin 122 protrudes from projection 120 in the manner of the first embodiment. Likewise, pin 122 engages with channels of the second part 114.

The second part 114 also has a cavity 138 define opening 136 for receiving an electrical cable. The second part 114 also includes cavity 132 defining opening 130. First and second channels 152 and 134 are provided for interacting with pin 122 as described in connection with the first embodiment. In this embodiment, cavity 132 has a shape which closely conforms with the shape of projection 120. The interaction of pin 122 and its corresponding channel 134 can be dimensioned such that when the first and second parts reach their final twisted assembled condition, a compressive force is exerted between the parts at the interface of projection 120 and cavity 132.

Cable locking device 110 provides a number of features beyond that of the first embodiment. First, the interaction of the convex shape of projection 122 and the concave matching shape of cavity 132 provides a high degree of electrical and thermal conductivity at the interface. The tapering interaction forms intimate contact between these surfaces generated by the axial force urging them together. This approach is consistent with applicants "Powerball"™ interfaces used in other components for electrical arc welding equipment. Another feature is the provision of threaded sleeves 154 and 156 which compress sealing bushings 158 and 160 against the outer surface of the attaching electrical cable. This illustration also shows a pair of setscrews 150 used at each end for connection of the consolidated lug ends of attaching electrical wires. An internally threaded sleeve 162 is provided which, once first and second parts 112 and 114 are connected together, can be threaded to create a tight clamping engagement between these parts. An O-ring within groove 142 provides fluid sealing between the two components. The housings of one or both the first or second parts 112 and 114 can feature an outer hex shape to allow sleeves 154, 156 and 162 to be tightened using conventional hand tools. Other features can be provided for enabling other types of tool engagement or manual operation of these components during the connecting and disconnecting of the locking device parts.

As a person skilled in the art will readily appreciate, the above description is meant as an illustration of an implementation of the principles of this invention. This description is not intended to limit the scope or application of this invention in that the invention is susceptible to modification, variation, and change, without departing from the spirit of this invention, as defined in the following claims.

The invention claimed is:

1. A cable locking device adapted for the connection of a first electrical wire to a second electrical wire, comprising:

a first part having a longitudinal axis and a first cavity for receiving the first electrical wire and a projection extending longitudinally from an opposite end relative to the first cavity, the projection forming a tapered convex surface symmetrical about the longitudinal axis of the first part;

a second part having a longitudinal axis and a first cavity for receiving the second electrical wire and a second cavity on the opposite longitudinal side of the first cavity having an opening that receives the projection of the first part, the second cavity having a tapered concave surface longitudinally opposite the opening and symmetrical about a longitudinal axis of the second part and corresponding in curvature to the tapered convex surface of the projection of the first part;

a first channel formed on an inner sidewall of the of the first cavity and extending longitudinally from the opening of the second cavity and formed within the second cavity of the second part;

a second channel formed on the inner sidewall within the second cavity of the second part, the second channel connected to the first channel and extending in a circumferential transverse direction of the first channel, wherein the first and second channel are radially enclosed and include a radially inwardly facing surface;

a pin extending radially outward from the projection of the first part, wherein the pin fits within the first channel such that the projection and pin slide longitudinally into the second cavity with the pin sliding through the first channel, and wherein the pin fits within the second channel such that the pin travels within the second channel when the first part is twisted about the longitudinal axis after the projection and pin are inserted into the second cavity; and wherein the pin frictionally engages the second channel so as to frictionally hold into place the pin with respect to the second channel so as to connect the first part to the second part;

wherein as the pin travels down the second channel from the first channel to an of travel in the second channel, sidewalls of the second channel engage the pin and prevents inadvertent disconnecting of the first part from the second part;

wherein the pin is frictionally engaged at the end of travel;

wherein disengagement of the pin from the end of travel from second channel toward the first channel requires a greater force than the initial frictional engagement.

2. The cable locking device of claim 1, wherein the first part and the second part are made of copper.

3. The cable locking device of claim 1, further comprising a seal located between the first part and the second part for creating a watertight seal when the first part is connected to the second part.

4. The cable locking device of claim 3, further comprising the seal is positioned in a groove within a rim formed by one of the first or the second part which fits within an annular cavity formed by the other of the first or the second part.

5. The cable locking device of claim 1, further comprising a set screw threaded into a bore in the first part for engaging with the first electrical wire.

6. The cable locking device of claim 1, further comprising a set screw threaded into a bore in the second part for engaging with the second electrical wire.

7. The cable locking device of claim 1, wherein the convex and concave surfaces are symmetrically curved, having a curvature defined by a curved notational line rotated about a central axis of the projection.

8. The cable locking device of claim 1, further comprising a threaded sleeve meshing with threads of the first or the second part and surrounding one of the first cavities for compressing a bushing against an outer surface of the first or second electrical wire.

9. The cable locking device of claim 1, wherein the pin and the at least one sidewall of the second channel are dimensioned such that when the first and second parts are assembled and the rotated relative to each other following insertion, a frictionally compressive force is exerted between the projection and the sidewalls of the second channel, such that the greater force is required to overcome the frictional engagement.

10. A cable locking device adapted for the connection of a first electrical wire to a second electrical wire, comprising:
    a first part having a projection and further a first cavity for receiving the first electrical wire;
    a second part having a second cavity and further having a first cavity for receiving the second electrical wire, wherein the projection is configured to be inserted into the second cavity of the second part, wherein the second cavity and the projection have corresponding shapes such that the projection is received with and mates with the second cavity;
    a first channel extending longitudinally and formed along the second cavity of the second part, the first channel extending from an opening of the second cavity;
    a second channel extending circumferentially along the second cavity of the second part, the second channel connected to the first channel and extending in a transverse direction of the first channel;
    wherein the first and second channels are radially enclosed and include a radially inward facing inner surface therealong;
    a pin and extending radially outward from the projection, wherein the pin travels along the first channel during insertion of the projection into the second cavity, and wherein the pin travels along the second channel during twisting of the first part relative to the second part after insertion of the projection into the second cavity; and
    wherein the pin frictionally engages at least one sidewall of the second channel during twisting so as to frictionally hold into place the pin at an end of travel of the pin with respect to the second channel so as to connect the first part to the second part;
    wherein frictional forces on the pin by the at least one sidewall increase during the twisting such that a greater force is required to disengage the pin from the end of travel in the second channel by twisting in the opposite direction.

11. The cable locking device of claim 10, wherein a terminal end of the projection forms a tapering curved convex outer surface and the second cavity of the second part has a tapering curved concave shape conforming with the terminal end of the projection.

12. The cable locking device of claim 10, wherein the first part has a circular channel that surrounds a base of the projection and the second part has a rim sized and shaped so as to fit in the circular channel.

13. The cable locking device of claim 10, wherein the pin is guided down the second channel in response to twisting the first part relative to the second part and the at least one sidewall of the second channel frictionally engages the pin as the pin travels down the second channel and applies a radially compressive force.

* * * * *